(12) United States Patent
Hasegawa

(10) Patent No.: US 9,220,026 B2
(45) Date of Patent: Dec. 22, 2015

(54) BASE STATION, WIRELESS TERMINAL, AND WIRELESS COMMUNICATION SYSTEM

(71) Applicant: FUJITSU LIMITED, Kawasaki-shi, Kanagawa (JP)

(72) Inventor: Tsuyoshi Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 14/132,546

(22) Filed: Dec. 18, 2013

(65) Prior Publication Data
US 2014/0119225 A1    May 1, 2014

Related U.S. Application Data

(63) Continuation of application No. PCT/JP2011/065488, filed on Jul. 6, 2011.

(51) Int. Cl.
| | |
|---|---|
| H04B 7/00 | (2006.01) |
| H04W 24/06 | (2009.01) |
| H04B 7/04 | (2006.01) |
| H04L 25/02 | (2006.01) |
| H04B 7/08 | (2006.01) |

(52) U.S. Cl.
CPC .............. *H04W 24/06* (2013.01); *H04B 7/0413* (2013.01); *H04B 7/0848* (2013.01); *H04L 25/0204* (2013.01); *H04L 25/0232* (2013.01); *H04B 7/0802* (2013.01)

(58) Field of Classification Search
CPC ............................ H04W 76/025; H04W 76/04
USPC ........................... 370/310, 328, 329, 342–345
See application file for complete search history.

(56) References Cited

U.S. PATENT DOCUMENTS

| | | | | |
|---|---|---|---|---|
| 7,436,757 | B1 * | 10/2008 | Wilson et al. ................. | 370/203 |
| 8,149,942 | B1 * | 4/2012 | Wang et al. .................... | 375/267 |
| 8,260,208 | B2 * | 9/2012 | Auer ........................... | 455/67.11 |

(Continued)

FOREIGN PATENT DOCUMENTS

| | | |
|---|---|---|
| EP | 2045943 A1 | 4/2009 |
| EP | 2169888 A1 | 3/2010 |
| EP | 2 234 354 A1 | 9/2010 |

(Continued)

OTHER PUBLICATIONS

The extended European search report (EESR) issued on Mar. 2, 2015 for corresponding European Application No. 11869014.8.
JPOA—Office Action for Japanese Patent Application No. 2013-522654 issued on Sep. 9, 2014 with English translation of relevant part: p. 1 line 17 to p. 6 line 1 and p. 7 line 12 to 18.

(Continued)

*Primary Examiner* — Dmitry H Levitan
(74) *Attorney, Agent, or Firm* — Fujitsu Patent Center

(57) ABSTRACT

A measuring unit measures channel values of propagation channels based on a pilot signal transmitted from a wireless terminal. An interpolation coefficient calculating unit calculates interpolation coefficients used to estimate channel values for one of antennas of the wireless terminal by using channel values for the rest of the antennas of the wireless terminal, which channel values are measured by the measuring unit. An estimate value calculating unit estimates the channel values for the one of the antennas of the wireless terminal based on the interpolation coefficients calculated by the interpolation coefficient calculating unit and the channel values for the rest of the antennas of the wireless terminal measured by the measuring unit.

9 Claims, 15 Drawing Sheets

(56) References Cited

U.S. PATENT DOCUMENTS

| | | | |
|---|---|---|---|
| 8,594,221 B2* | 11/2013 | Chen et al. | 375/267 |
| 2013/0039400 A1 | 2/2013 | Hasegawa | |

FOREIGN PATENT DOCUMENTS

| | | |
|---|---|---|
| EP | 2234354 A1 | 9/2010 |
| JP | 2003-060423 A | 2/2003 |
| JP | 2010-527165 A | 8/2010 |
| JP | 2010-226723 | 10/2010 |
| JP | 2010-226723 A | 10/2010 |
| WO | WO 2009/060650 A1 | 5/2009 |
| WO | WO 2011/132262 A1 | 10/2011 |
| WO | 2012153204 A1 | 11/2012 |

OTHER PUBLICATIONS

KROA—Office Action of Korean Patent Application No. 10-2013-7035033 dated Nov. 26, 2014, with English language translation.

ESR—Supplementary Partial European Search Report of European Patent Application No. EP11869014.8 dated Nov. 27, 2014.

Gunther Auer, 3d Pilot Aided Channel Estimation, Wireless Communications and Networking Conference 2009 IEEE, Apr. 5, 2010.

International Search Report issued for corresponding International Patent Application No. PCT/JP2011/065488, mailed Oct. 4, 2011 with English translation.

KROA—Korean Office Action issued on Jun. 9, 2015 for corresponding Korean Patent Application No. 10-2013-7035033, with English translation.

* cited by examiner

FIG. 2
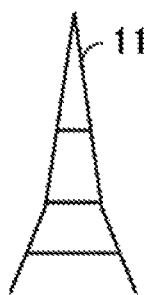
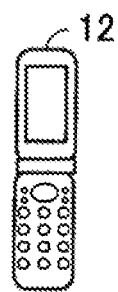

FIG. 8

$$\begin{pmatrix} e_{11} & e_{21} & e_{31} \\ e_{12} & e_{22} & e_{32} \\ e_{13} & e_{23} & e_{33} \end{pmatrix} \longrightarrow \begin{array}{l} E_1 = |e_{11}|^2 + |e_{21}|^2 + |e_{31}|^2 \\ E_2 = |e_{12}|^2 + |e_{22}|^2 + |e_{32}|^2 \\ E_3 = |e_{13}|^2 + |e_{23}|^2 + |e_{33}|^2 \end{array}$$

BASE STATION, WIRELESS TERMINAL, AND WIRELESS COMMUNICATION SYSTEM

CROSS-REFERENCE TO RELATED APPLICATION

This application is a continuation application of International Application PCT/JP2011/065488 filed on Jul. 6, 2011, which designated the U.S., the entire contents of which are incorporated herein by reference.

FIELD

The embodiments discussed herein are related to a base station, a wireless terminal, and a wireless communication system.

BACKGROUND

For wireless communication, multiple-input and multiple-output, or MIMO, technology using a plurality of antennas has been proposed in recent years. According to this technology, a pilot signal is transmitted from each transmit antenna to secure propagation channels for the transmit antenna.

In this case, at an instant when one antenna is transmitting a pilot signal, other antennas are unable to perform transmission. Therefore, an increase in the number of antennas incurs increased pilot signal overhead other than data transmission at the cost of reduced transmission efficiency.

Note that there has been conventionally proposed a method for selecting antennas in a space-division multiple access (SDMA) wireless network that includes a base station and a set of mobile stations (see Japanese National Publication of International Patent Application No. 2010-527165, for example).

There has been also conventionally proposed a beam forming method for an improved two-dimensional smart antenna array suited for used in a cellular base station (see Japanese Laid-open Patent Publication No. 2003-60423, for example).

As described above, the MIMO wireless communication has a problem that the pilot signal overhead increases as the number of antennas increases, causing a decrease in data transmission efficiency.

SUMMARY

According to an aspect of the embodiments, there is provided a base station for wirelessly communicating with a wireless terminal having a plurality of transmit antennas using multiple-input and multiple-output. The base station includes a measuring unit configured to measure channel values of propagation channels based on a pilot signal transmitted from the wireless terminal; an interpolation coefficient calculating unit configured to calculate interpolation coefficients used to estimate channel values for one of the transmit antennas of the wireless terminal by using channel values for rest of the transmit antennas, which channel values are measured by the measuring unit; and an estimate value calculating unit configured to estimate the channel values for the one of the transmit antennas based on the interpolation coefficients calculated by the interpolation coefficient calculating unit and the channel values for the rest of the transmit antennas measured by the measuring unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a wireless communication system according to a second embodiment;
FIG. 8 illustrates an operation of a determining unit.

DESCRIPTION OF EMBODIMENTS

Embodiments are described in detail below with reference to the accompanying drawings.

First Embodiment

Figure 1:
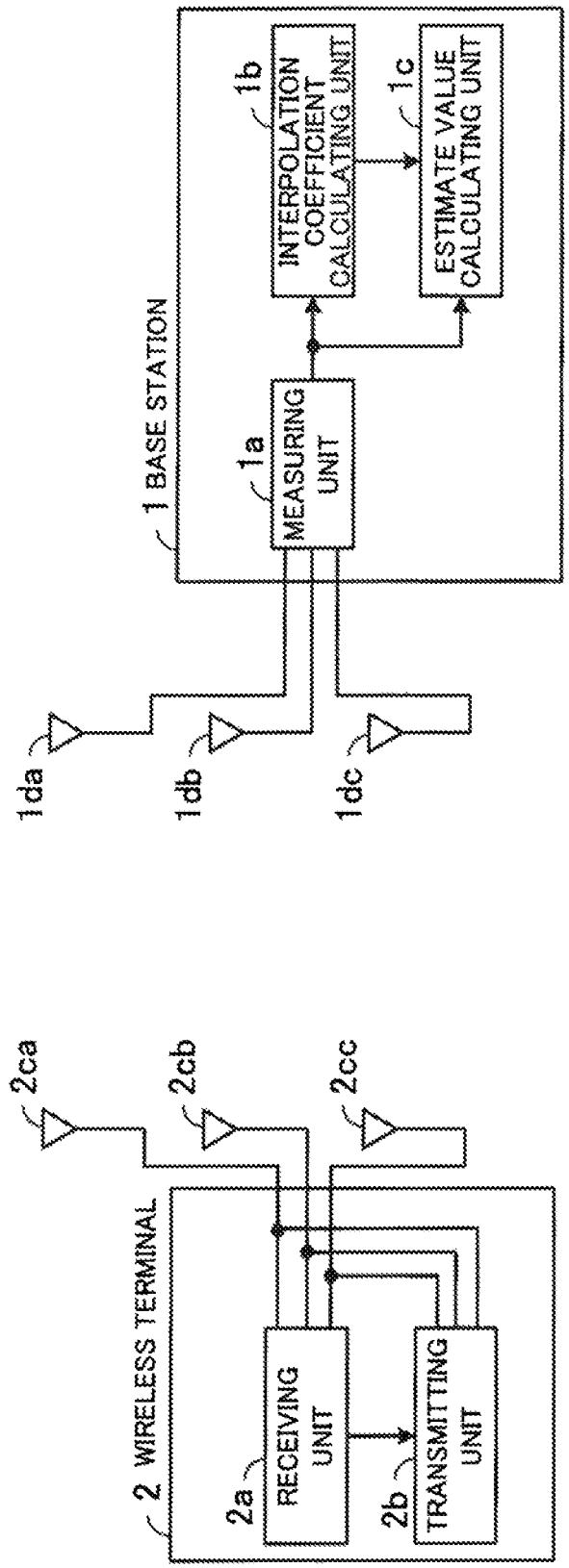
FIG. 1 illustrates a wireless communication system according to a first embodiment.

FIG. 1 illustrates a wireless communication system according to a first embodiment. As illustrated in FIG. 1, the wireless communication system includes a base station 1 and a wireless terminal 2. The base station 1 includes a measuring unit 1a, an interpolation coefficient calculating unit 1b, an estimate value calculating unit 1c, and antennas 1da to 1dc. The wireless terminal 2 includes a receiving unit 2a, a transmitting unit 2b, and antennas 2ca to 2cc. The base station 1 and the wireless terminal 2 wirelessly communicate with each other using MIMO technology.

The measuring unit 1a of the base station 1 measures channel values of uplink (i.e., from the wireless terminal 2 to the base station 1) propagation channels based on a pilot signal transmitted from the wireless terminal 2. Channel values measured by the measuring unit 1a may be hereinafter referred to as channel measured values.

The interpolation coefficient calculating unit 1b calculates interpolation coefficients used to estimate channel values for one of the antennas 2ca to 2cc of the wireless terminal 2 by using channel measured values of the rest of the antennas 2ca to 2cc of the wireless terminal 2.

For example, the interpolation coefficient calculating unit 1b calculates interpolation coefficients used to estimate channel values for the antenna 2ca of the wireless terminal 2 by using channel measured values of the remaining antennas 2cb and 2cc of the wireless terminal 2.

The estimate value calculating unit 1c estimates channel values for one of the antennas 2ca to 2cc of the wireless terminal 2 based on the interpolation coefficients calculated by the interpolation coefficient calculating unit 1b and the channel measured values of the rest of the antennas 2ca to 2cc of the wireless terminal 2.

For example, the estimate value calculating unit 1c estimates channel values for the antenna 2ca of the wireless terminal 2 based on the interpolation coefficients for the antenna 2ca of the wireless terminal 2 calculated by the interpolation coefficient calculating unit 1b and the channel measured values of the remaining antennas 2cb and 2cc of the wireless terminal 2.

With this, the base station 1 is able to estimate the channel values for the antenna 2ca based on the interpolation coefficients and the channel measured values for the other antennas 2cb and 2cc even if the pilot signal for channel value measurement is not transmitted from the antenna 2ca of the wireless terminal 2.

The base station 1 transmits antenna information indicating an antenna of the wireless terminal 2, whose pilot signal transmission is to be stopped, to the wireless terminal 2 from a transmitting unit (not illustrated in FIG. 1).

For example, according to the example described above, the base station 1 transmits antenna information indicating the antenna 2ca to the wireless terminal 2 because being able to estimate the channel values for the antenna 2ca.

The receiving unit 2a of the wireless terminal 2 receives the antenna information from the base station 1. The transmitting unit 2b stops pilot signal transmission from a transmit antenna indicated by the antenna information received by the receiving unit 2a.

For example, the transmitting unit 2b stops pilot signal transmission from the antenna 2ca while transmitting the pilot signal to the base station 1 from the antennas 2cb and 2cc.

Note that, as described above, the base station 1 is able to estimate the channel values for the antenna 2ca whose pilot signal transmission has been stopped, by using the channel measured values for the antennas 2cb and 2cc and the interpolation coefficients. That is, the base station 1 is able to obtain the channel values for the antennas 2ca to 2cc and thereby demodulate and decode data transmitted from the wireless terminal 2.

Thus, the base station 1 is configured to estimate channel values for an antenna 2ca, 2cb or 2cc from which no pilot signal is transmitted, by using channel, measured values for the rest of the antennas 2ca to 2cc and interpolation coefficients. In addition, the wireless terminal 2 is configured to stop pilot signal transmission from an antenna 2ca, 2cb or 2cc determined by the base station 1.

With this, the wireless terminal 2 does not have to transmit the pilot signal from all the antennas 2ca to 2cc, which prevents increased pilot signal overhead of the wireless terminal 2 even when the number of the antennas 1da to 1dc and 2ca to 2cc of the base station 1 and the wireless terminal 2 increases. As a result, it is possible to reduce a decrease in data transmission efficiency.

In addition, even when the channel values for the antenna 2ca, 2cb, or 2cc of the wireless terminal 2, whose pilot signal transmission has been stopped, change according to the environment or the like, the base station 1 estimates the channel values for the stopped antenna 2ca, 2cb, or 2cc by using the channel measured values for the rest of the antennas 2ca to 2cc correlated with the stopped antenna 2ca, 2cb, or 2cc. Herewith, the base station 1 is able to estimate appropriate channel values.

Second Embodiment

FIG. 2 illustrates a wireless communication system according to a second embodiment. As illustrated in FIG. 2, the wireless communication system includes a base station 11 and a wireless terminal 12. The wireless terminal 12 is, for example, a mobile phone, and wirelessly communicates with the base station 11 using Long Term Evolution (LTE). Each of the base station 11 and the wireless terminal 12 is provided with a plurality of antennas to thereby wirelessly communicate using MIMO technology.

Operations of the wireless communication system of FIG. 2 are, for example, largely classified into two, first and second operations. For example, in the first operation, the wireless terminal 12 transmits, to the base station 11, a pilot signal using all the antennas. Then, the base station 11 determines an antenna of the wireless terminal 12, whose pilot signal transmissions is to be stopped, and reports antenna information indicating the determined antenna to the wireless terminal 12. At this time, the base station 11 calculates interpolation coefficients (to be described later) used to calculate (estimate) uplink channel values for the antenna whose pilot signal transmission is stopped, by using the pilot signal of the remaining antennas other than the antenna with no pilot signal transmission.

For example, the wireless terminal 12 is provided with antennas A to C. The base station 11 determines, for example, in the first operation that pilot signal transmission from the antenna A may be stopped, and then indicates the wireless terminal 12 to stop pilot signal transmission from the antenna A. At this point, the base station 11 calculates interpolation coefficients used to calculate uplink channel values for the antenna A by using the pilot signal transmitted from the antennas B and C of the wireless terminal 12.

In the second operation, the wireless terminal 12 transmits the pilot signal from antennas except for the antenna indicated by the base station 11 to stop pilot signal transmission. The base station 11 calculates the uplink channel values for the antenna with no pilot signal transmission by using the transmitted pilot signal and the interpolation coefficients calculated in the first operation, and then demodulates and decodes signals transmitted from the wireless terminal 12.

Assume here that the wireless terminal 12 is indicated by the base station 11 to stop pilot signal transmission from the antenna A. In this case, the wireless terminal 12 transmits, to the base station 11, the pilot signal using the antennas B and C. Based on the pilot signal transmitted from the antennas B and C, the base station 11 calculates uplink channel values for the antennas B and C. In addition, the base station 11 calculates uplink channel values for the antenna A by using the pilot signal transmitted from the antennas B and C and the interpolation coefficients calculated in the first operation. Using the calculated channel values for the antennas A to C, the base station 11 demodulates and decodes signals transmitted from the wireless terminal 12.

Thus, the base station 11 determines an antenna of the wireless terminal 12, whose pilot signal transmission may be stopped. The wireless terminal 12 transmits, to the base station 11, the pilot signal from antennas other than the antenna determined by the base station 11. Subsequently, using the pilot signal transmitted from the wireless terminal 12, the base station 11 calculates uplink channel values for all the antennas of the wireless terminal 12. With this, the wireless terminal 12 does not have to transmit the pilot signal from all the antennas, which prevents increased pilot signal overhead of the wireless terminal 12 even when the number of antennas of the base station 11 and the wireless terminal 12 increases. As a result, it is possible to reduce a decrease in data transmission efficiency.

In addition, the base station 11 estimates the channel values for the antenna whose pilot signal transmission has been stopped by using the channel measured values for the remaining antennas correlated with the stopped antenna. Herewith, the base station 11 is able to estimate appropriate channel values.

Note that, in the first operation, the wireless terminal 12 transmits the pilot signal from all the antennas. Therefore, in the first operation, the base station 11 is able to measure channel values for all the antennas based on the pilot signal transmitted from all the antennas. As a result, the base station 11 demodulates and decodes user data transmitted from the wireless terminal 12 by using the measured channel values while calculating the interpolation coefficients in the first operation.

Figure 3:
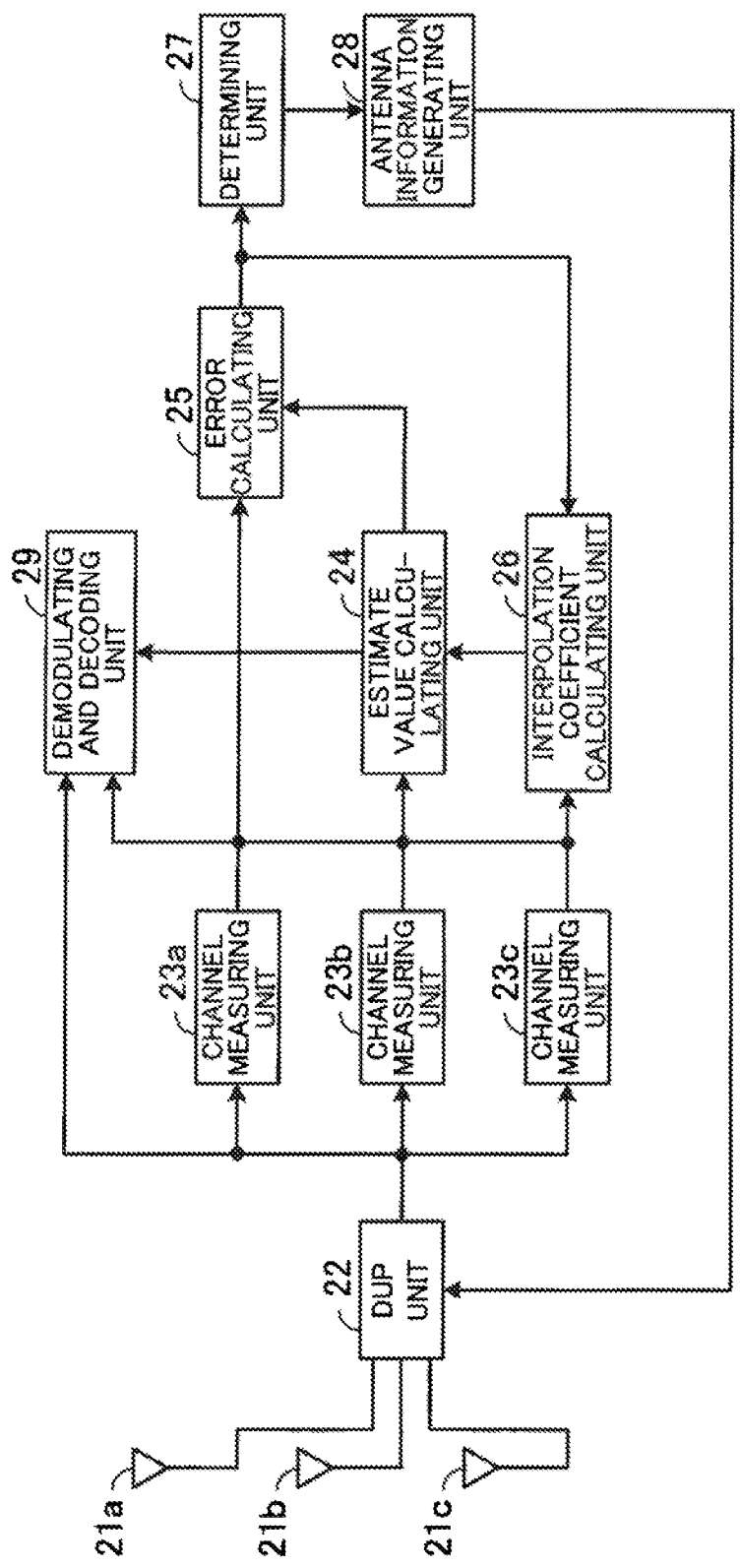
FIG. 3 is a block diagram of a base station.

FIG. 3 is a block diagram of a base station. As illustrated in FIG. 3, the base station 11 includes antennas 21a to 21c, a duplex (DUP) unit 22, channel measuring units 23a to 23c, an estimate value calculating unit 24, an error calculating unit 25, an interpolation coefficient calculating unit 26, a determining unit 27, an antenna information generating unit 28, and a demodulating and decoding unit 29.

The antennas 21a to 21c receive signals wirelessly transmitted from the wireless terminal 12 and then output the signals to the DUP unit 22. Each of the antennas 21a to 21c also wirelessly transmits a signal output from the DUP unit 22 to the wireless terminal 12. Note that FIG. 3 depicts three antennas for illustrative purposes, however, the number of antennas is not limited to this case.

The DUP unit 22 outputs signals received by the antennas 21a to 21c to the channel measuring units 23a to 23c and the demodulating and decoding unit 29. In addition, the DUP unit 22 outputs antenna information output from the antenna information generating unit 28 to the antennas 21a to 21c. The antenna information is used, for example, to stop pilot signal transmission from an antenna of the wireless terminal 12.

The channel measuring units 23a to 23c measure (calculate) channel values indicating the condition of uplink propagation channels based on the pilot signal transmitted by the wireless terminal 12. Assume here that the wireless terminal 12 is provided with three antennas (antennas A to C). In this case, the channel measuring units 23a to 23c calculate channel values for propagation channels between the antenna A and the individual antennas 21a to 21c. Similarly, the channel measuring units 23a to 23c calculate channel values for propagation channels between the antenna B and the individual antennas 21a to 21c as well as between the antenna C and the individual antennas 21a to 21c. Thus, the channel measuring units 23a to 23c calculate nine channel values in total.

Note that in the case where, for example, the wireless terminal 12 stops pilot signal transmission from the antenna A while transmitting the pilot signal from the antennas B and C, the channel measuring units 23a to 23c calculate channel values for the individual antennas B and C with respect to each of the antennas 21a to 21c (i.e., six channel values). Channel values for the antenna A with respect to each of the antennas 21a to 21c (three channel values) are estimated by the estimate value calculating unit 24. With this, the channel values for the antennas A to C with respect to each of the antennas 21a to 21c are obtained. Channel values output from the channel measuring units 23a to 23c may be hereinafter referred to as channel measured values.

The estimate value calculating unit 24 calculates channel estimate values for an antenna of the wireless terminal 12 by using channel measured values for the remaining antennas of the wireless terminal 12 and interpolation coefficients.

For example, the estimate value calculating unit 24 calculates channel estimate values for the antenna A of the wireless terminal 12 (three channel estimate values for the antenna A with respect to each of the antennas 21a to 21c) by using six channel measured values for the remaining antennas B and C and interpolation coefficients. Note that the six channel measured values for the antennas B and C are output from the channel measuring units 23a to 23c and the interpolation coefficients are output from the interpolation coefficient calculating unit 26.

The error calculating unit 25 calculates errors between channel estimate values for an antenna of the wireless terminal 12 calculated by the estimate value calculating unit 24 and channel measured values for the antenna.

For example, the error calculating unit 25 calculates errors between channel estimate values for the antenna A output from the estimate value calculating unit 24 and channel measured values for the antenna A output from the channel measuring units 23a to 23c. That is, the error calculating unit 25 calculates errors of the channel estimate values with respect to the channel measured values for the antenna A. Note that in the first operation for determining an antenna whose pilot signal transmission is to be stopped, the pilot signal is output from all the antennas A to C of the wireless terminal 12 and, also, channel measured values for the antenna A are output from the channel measuring units 23a to 23c.

The interpolation coefficient calculating unit 26 calculates interpolation coefficients based on the errors calculated by the error calculating unit 25 and the channel measured values for the remaining antennas of the wireless terminal 12.

Assume here that the error calculating unit 25 outputs errors for the antenna A. In this case, the interpolation coefficient calculating unit 26 calculates interpolation coefficients based on the errors for the antenna A and the channel measured values for the remaining antennas B and C of the wireless terminal 12. The interpolation coefficient calculating unit 26 calculates the interpolation coefficients using, for example, a least mean square (LMS) algorithm.

The determining unit 27 determines an antenna of the wireless terminal 12, whose pilot signal transmission is to be stopped, based on the errors calculated by the error calculating unit 25.

For example, in the first operation, the estimate value calculating unit 24 calculates channel estimate values for the individual antennas A to C, and the error calculating unit 25 calculates errors for the individual antennas A to C. In addition, the interpolation coefficient calculating unit 26 calculates interpolation coefficients for the individual antennas A to C. The determining unit 27 calculates an electric power of the errors for each of the antennas A to C of the wireless terminal 12, calculated by the error calculating unit 25. The determining unit 27 selects the smallest one from among the calculated error powers and, then, determines whether the selected error power is below a predetermined threshold. When determining that the error power is below the predetermined threshold, the determining unit 27 determines an antenna corresponding to the error power to be stopped from transmitting the pilot signal.

The antenna information generating unit 28 generates antenna information corresponding to the antenna whose pilot signal transmission has been determined by the determining unit 27 to be stopped. The generated antenna information is output to the DUP unit 22 and subsequently transmitted to the wireless terminal 12.

Assume that the determining unit 27 determines the antenna A to be stopped from transmitting the pilot signal. In this case, the antenna information generating unit 28 generates antenna information including, for example, identification information for identifying the antenna A. In response to reception of the antenna information including the identification information of the antenna A, the wireless terminal 12 stops pilot signal transmission from the antenna A.

Note that, in the second operation, the estimate value calculating unit 24 calculates channel estimate values for the antenna whose pilot signal transmission has been stopped, by using the interpolation coefficients calculated by the interpolation coefficient calculating unit 26 in the first operation and the channel measured values for the remaining antennas.

Assume here that the wireless terminal 12 stops pilot signal transmission from the antenna A. In this case, the estimate value calculating unit 24 calculates channel estimate values for the antenna A by using the interpolation coefficients for the antenna A calculated by the interpolation coefficient calculating unit 26 in the first operation and the channel measured values for the antennas B and C.

Figure 4:
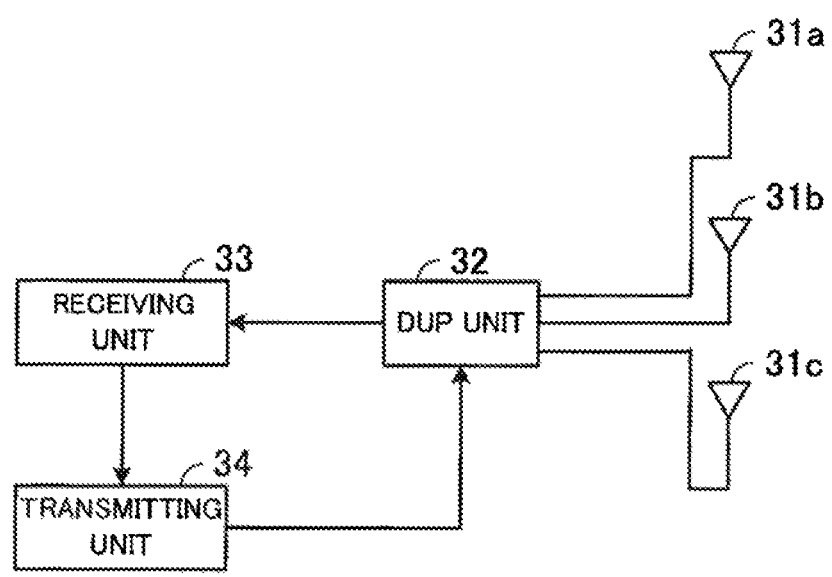
FIG. 4 is a block diagram of a wireless terminal.

FIG. 4 is a block diagram of a wireless terminal. As illustrated in FIG. 4, the wireless terminal 12 includes antennas 31a to 31c, a DUP unit 32, a receiving unit 33, and a transmitting unit 34.

The antennas 31a to 31c receive signals wirelessly transmitted from the base station 11 and then output the signals to the DUP unit 32. Each of the antennas 31a to 31c also wirelessly transmits a signal output from the DUP unit 32 to the base station 11. Note that FIG. 4 depicts three antennas for illustrative purposes, however, the number of antennas is not limited to this case. The antennas A to C described above individually correspond, for example, to the antennas 31a to 31c.

The DUP unit 32 outputs signals received by the antennas 31a to 31c to the receiving unit 33. In addition, the DUP unit 32 outputs a signal sent from the transmitting unit 34 to the antennas 31a to 31c.

The receiving unit 33 receives antenna information indicating an antenna 31a, 31b, or 31c, whose pilot signal transmission is to be stopped, from the base station 11 that calculates channel estimate values in the case where pilot signal transmission from the antenna 31a, 31b, or 31c is stopped.

The transmitting unit 34 stops pilot signal transmission from the antenna 31a, 31b, or 31c based on the antenna information received by the receiving unit 33. For example, in the case where the receiving unit 33 receives antenna information indicating that pilot signal transmission from the antenna 31a is to be stopped, the transmitting unit 34 transmits the pilot signal from the antennas 31b and 31c.

Next described is interpolation coefficient calculation carried out by the base station 11.

Figure 5:
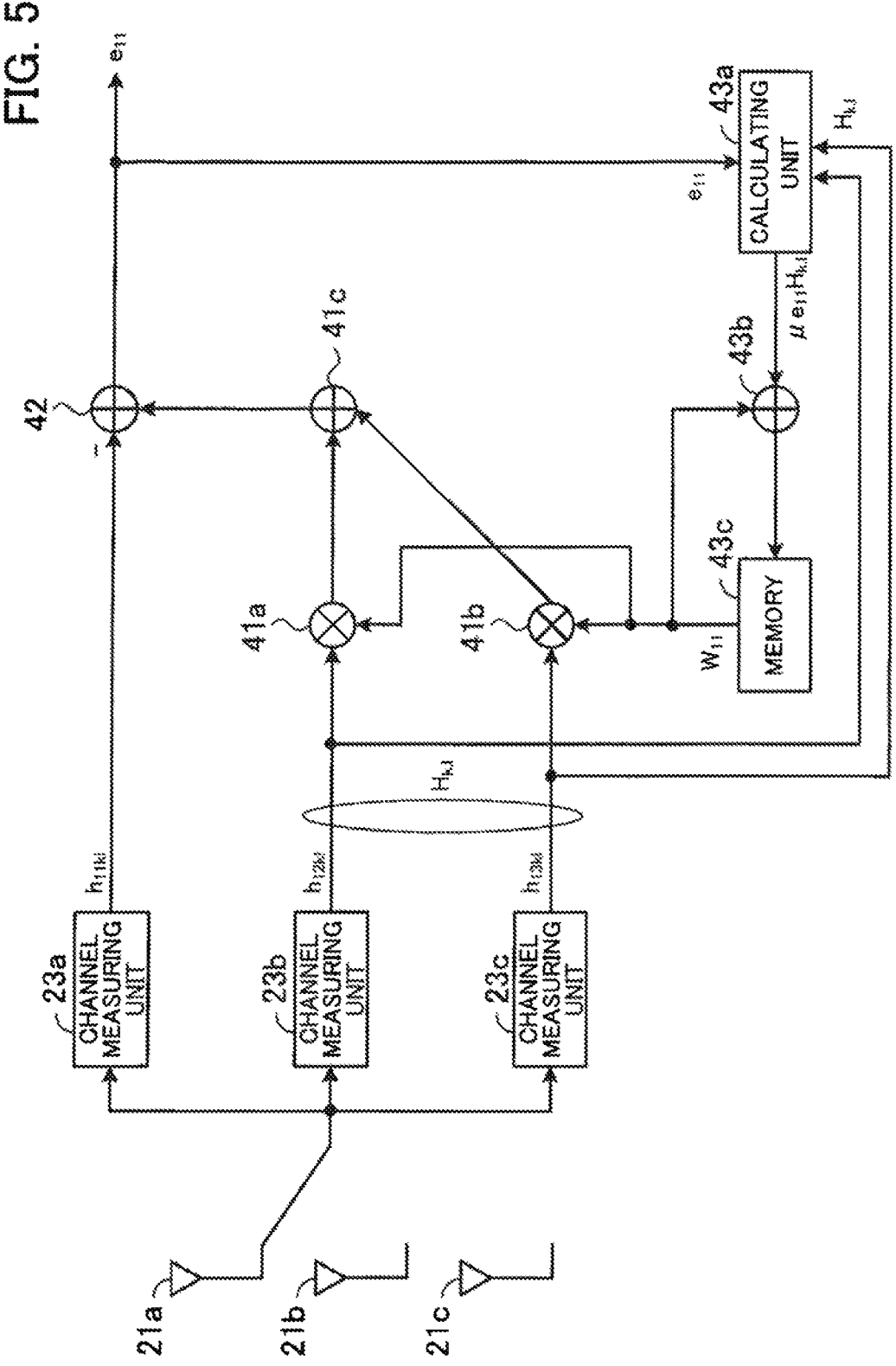
FIG. 5 is a first diagram illustrating an interpolation coefficient calculation operation of the base station.

FIG. 5 is a first diagram illustrating an interpolation coefficient calculation operation of a base station. FIG. 5 depicts the antennas 21a to 21c and the channel measuring units 23a to 23c described in FIG. 3. Multipliers 41a and 41b and an adder 41c of FIG. 5 collectively correspond, for example, to the estimate value calculating unit 24 of FIG. 3. An adder 42 corresponds, for example, to the error calculating unit 25 of FIG. 3. A calculating unit 43a, an adder 43b, and a memory 43c collectively correspond, for example, to the interpolation coefficient calculating unit 26 of FIG. 3. Note that FIG. 5 omits other blocks appearing in FIG. 3.

The interpolation coefficient calculation of the base station 11 takes place in the first operation, as described in FIG. 2. Therefore, the pilot signal is transmitted from all the antennas 31a to 31c of the wireless terminal 12.

The pilot signal received by the antenna 21a is input to the channel measuring units 23a to 23c. Based on the pilot signal received by the antenna 21a, the channel measuring units 23a to 23c calculate channel measured values for channels between the individual antennas 31a no 31c of the wireless terminal 12 and the antenna 21a.

Symbols $h_{11kl}$ to $h_{13kl}$ of FIG. 5 denote the channel measured values for the channels between the individual antennas 31a to 31c of the wireless terminal 12 and the antenna 21a. As for the symbol $h_{ijkl}$, the letter i denotes a receive antenna (the antenna 21a, 21b, or 21c of the base station 11) and the letter j denotes a transmit antenna (the antenna 31a, 31b, or 31c of the wireless terminal 12).

Assume here that the antennas 21a to 21c of the base station 11 are receive antennas 1 to 3, respectively, and the antennas 31a to 31c of the wireless terminal 12 are transmit antennas 1 to 3, respectively. In this case, the symbol $h_{11kl}$ denotes a channel measured value for a channel between the transmit antenna 1 and the receive antenna 1. Similarly, the symbol $h_{12kl}$ denotes a channel measured value for a channel between the transmit antenna 2 and the receive antenna 1, and the symbol $h_{13kl}$ denotes a channel measured value for a channel between the transmit antenna 3 and the receive antenna 1.

Note that the letter k of the symbol $h_{ijkl}$ denotes a subcarrier number and the letter l denotes a slot number. Therefore, nine channel values are calculated for a given frequency at a point in time.

FIG. 5 depicts the operation for estimating a channel value for the channel between the transmit antenna 1 and the receive antenna 1 and then calculating an interpolation coefficient in this situation. Therefore, in FIG. 5, the channel value for the channel between the transmit antenna 1 and the receive antenna 1 is estimated using the channel measured values $h_{12kl}$ and $h_{13kl}$ for the transmit antennas 2 and 3 other than the transmit antenna 1. A pair of the channel measured values $(h_{12kl}, h_{13kl})$ for the remaining transmit antennas 2 and 3 may be hereinafter referred to as a channel vector $H_{kl}$.

The memory 43c stores therein an interpolation coefficient $W_{11}$. The interpolation coefficient $W_{11}$ is a weight vector with one row and two columns. The interpolation coefficient $W_{11}$ stored in the memory 43c as an initial value for calculating the channel estimate value is, for example, (0.5, 0.5).

As for the multiplier 41a, the channel measured value $h_{12kl}$ for the transmit antenna 2 and the value at row 1 and column 1 of the interpolation coefficient $W_{11}$ are input thereto. The multiplier 41a multiplies the channel measured value $h_{12kl}$ by the value at row 1 and column 1 of the interpolation coefficient $W_{11}$ and then outputs the multiplication result to the adder 41c.

As for the multiplier 41b, the channel measured value $h_{13kl}$ for the transmit antenna 3 and the value at row 1 and column 2 of the interpolation coefficient $W_{11}$ are input thereto. The multiplier 41b multiplies the channel measured value $h_{13kl}$ by the value at row 1 and column 2 of the interpolation coefficient $W_{11}$ and then outputs the multiplication result to the adder 41c.

The adder 41c adds the values output from the multipliers 41a and 41b. That is, the multipliers 41a and 41b and the adder 41c calculate an inner product $H_{kl} \cdot W_{11}$ of the channel vector $H_{kl}$ of the transmit antennas 2 and 3 other than the transmit antenna 1 and the interpolation coefficient $W_{11}$ stored in the memory 43c. The inner product value may be hereinafter referred to as a channel estimate value for the transmit antenna 1.

The adder 42 adds the channel estimate value for the transmit antenna 1 output from the adder 41c and the negative of the channel measured value for the transmit antenna 1 output from the channel measured unit 23a. That is, the adder 42 calculates an error between the channel estimate value and the channel measured value for the transmit antenna 1, which channel estimate value is estimated using the channel vector $H_{kl}$ of the transmit antennas 2 and 3 and the interpolation coefficient $W_{11}$. An error value $e_{11}$ output from the adder 42 is then output to the calculating unit 43a. In addition, the error value $e_{11}$ is also output to the determining unit 27 described in FIG. 3.

The calculating unit 43a multiplies the channel vector $H_{kl}$ of the transmit antennas 2 and 3, output from the channel measuring units 23b and 23c, by the error value $e_{11}$, which is then multiplied by a step size parameter μ. The calculating unit 43a outputs the product $μe_{11}H_{kl}$ to the adder 43b.

The adder 43b adds the interpolation coefficient $W_{11}$ stored in the memory 43c and the product $μe_{11}H_{kl}$ output from the calculating unit 43a. The result of the addition obtained by the adder 43b is stored in the memory 43c. That is, the interpolation coefficient $W_{11}$ stored in the memory 43c is updated.

The blocks of FIG. 5 repeat the above-described processing a predetermined number of times. When it is possible to interpolate the channel estimate value for the transmit antenna 1 using the channel measured values for the transmit antennas 2 and 3, the interpolation coefficient $W_{11}$ converges to an appropriate value. Then, the error value $e_{11}$ output from the adder 42 comes close to zero.

Figure 6:
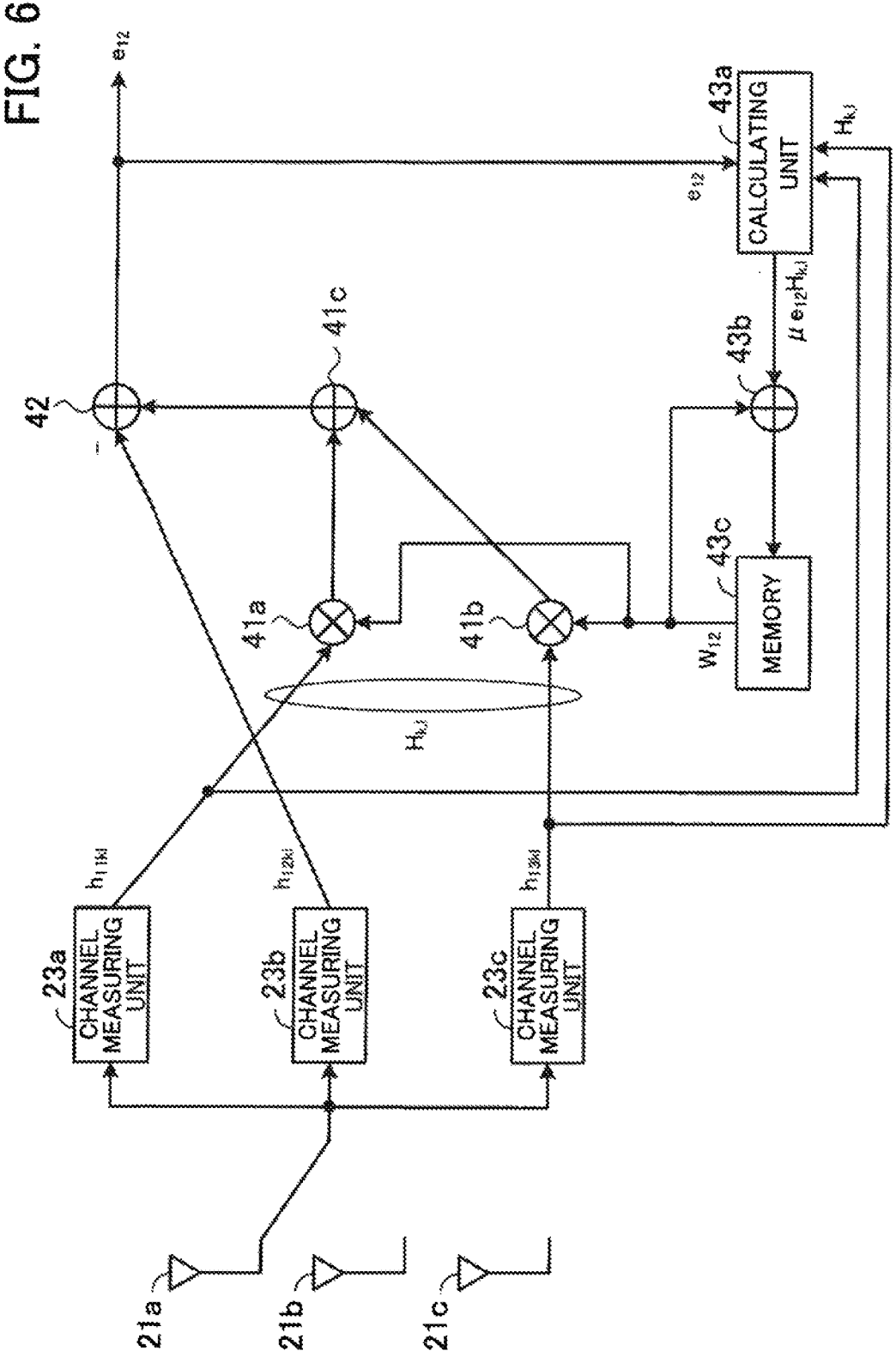
FIG. 6 is a second diagram illustrating the interpolation coefficient calculation operation of the base station.

FIG. 6 is a second diagram illustrating the interpolation coefficient calculation operation of the base station. FIG. 6 depicts the operation for estimating a channel value for the channel between the transmit antenna 2 and the receive antenna 1 and then calculating an interpolation coefficient in this situation. In FIG. 6, like reference numerals are given to like elements illustrated in FIG. 5.

In FIG. 6, the channel value for the channel between the transmit antenna 2 and the receive antenna 1 is estimated using the channel measured values $h_{11kl}$ and $h_{13kl}$ for the transmit antennas 1 and 3 other than the transmit antenna 2. A pair of the channel measured values ($h_{11kl}$, $h_{13kl}$) may be hereinafter referred to as a channel vector $H_{kl}$.

The memory 43c stores therein an interpolation coefficient $W_{12}$. The interpolation coefficient $W_{12}$ is a weight vector with one row and two columns. The interpolation coefficient $W_{12}$ stored in the memory 43c as an initial value for calculating the channel estimate value is, for example, (0.5, 0.5).

As for the multiplier 41a, the channel measured value $h_{11kl}$ for the transmit antenna 1 and the value at row 1 and column 1 of the interpolation coefficient $W_{12}$ are input thereto. The multiplier 41a multiplies the channel measured value $h_{11kl}$ by the value at row 1 and column 1 of the interpolation coefficient $W_{12}$ and then outputs the multiplication result to the adder 41c.

As for the multiplier 41b, the channel measured value $h_{13kl}$ for the transmit antenna 3 and the value at row 1 and column 2 of the interpolation coefficient $W_{12}$ are input thereto. The multiplier 41b multiplies the channel measured value $h_{13kl}$ by the value at row 1 and column 2 of the interpolation coefficient $W_{12}$ and then outputs the multiplication result to the adder 41c.

The adder 41c adds the values output from the multipliers 41a and 41b. That is, the multipliers 41a and 41b and the adder 41c calculate an inner product $H_{kl} \cdot W_{12}$ of the channel vector $H_{kl}$ of the transmit antennas 1 and 3 other than the transmit antenna 2 and the interpolation coefficient $W_{12}$ stored in the memory 43c. The inner product value may be hereinafter referred to as a channel estimate value for the transmit antenna 2.

The adder 42 adds the channel estimate value for the transmit antenna 2 output from the adder 41c and the negative of the channel measured value for the transmit antenna 2 output from the channel measured unit 23b. That is, the adder 42 calculates an error between the channel estimate value and the channel measured value for the transmit antenna 2, which channel estimate value is estimated using the channel vector $H_{kl}$ of the transmit antennas 1 and 3 and the interpolation coefficient $W_{12}$. An error value $e_{12}$ output from the adder 42 is then output to the calculating unit 43a. In addition, the error value $e_{12}$ is also output to the determining unit 27 described in FIG. 3.

The calculating unit 43a multiplies the channel vector $H_{kl}$ of the transmit antennas 1 and 3, output from the channel measuring units 23a and 23c, by the error value $e_{12}$, which is then multiplied by the step size parameter μ. The calculating unit 43a outputs the product $μe_{12}H_{kl}$ to the adder 43b.

The adder 43b adds the interpolation coefficient $W_{12}$ stored in the memory 43c and the product $μe_{12}H_{kl}$ output from the calculating unit 43a. The result of the addition obtained by the adder 43b is stored in the memory 43c, That is, the interpolation coefficient $W_{12}$ stored in the memory 43c is updated.

The blocks of FIG. 6 repeat the above-described processing a predetermined number of times. When it is possible to interpolate the channel estimate value for the transmit antenna 2 using the channel measured values for the transmit antennas 1 and 3, the interpolation coefficient $W_{12}$ converges to an appropriate value. Then, the error value $e_{12}$ output from the adder 42 comes close so zero.

The base station 11 carries out the operation described in FIGS. 5 and 6 with respect to the transmit antenna 3. That is, the base station 11 estimates a channel value for the channel between the transmit antenna 3 and the receive antenna 1 and then calculates an error value $e_{13}$ and an interpolation coefficient $W_{13}$.

In the above-described case, the pilot signal transmitted from the transmit antennas 1 to 3 is received by the receive antenna 1, and the channel values for the individual transmit antennas 1 to 3 are estimated. Similarly, the base station 11 receives the pilot signal transmitted from the transmit antennas 1 to 3 by the receive antenna 2, and then estimates the channel values for the individual transmit antennas 1 to 3.

Figure 7:
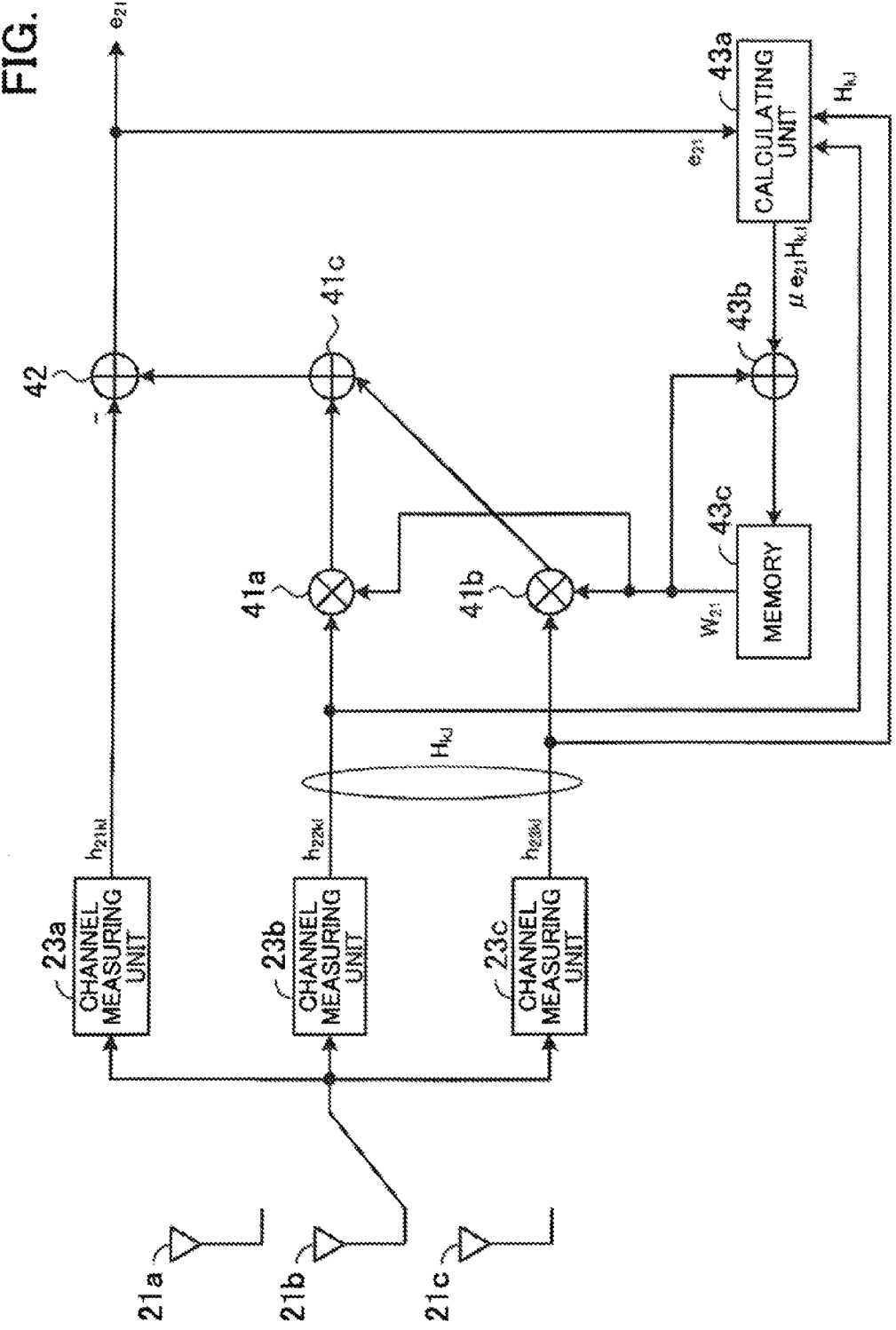
FIG. 7 is a third diagram illustrating the interpolation coefficient calculation operation of the base station.

FIG. 7 is a third diagram illustrating the interpolation coefficient calculation operation of the base station. FIG. 7 depicts the operation for estimating a channel value for the channel between the transmit antenna 1 and the receive antenna 2 and then calculating an interpolation coefficient in this situation. In FIG. 7, like reference numerals are given to like elements illustrated in FIG. 5.

In FIG. 7, the pilot signal received by the antenna 21b (the receive antenna 2) is input to the channel measuring units 23a to 23c. The channel measuring units 23a to 23c calculate channel measured values $h_{21kl}$, $h_{22kl}$, and $h_{23kl}$ with respect to the transmit antennas 1 to 3 for the case where the pilot signal is received by the receive antenna 2.

In FIG. 7, the channel value for the channel between the transmit antenna 1 and the receive antenna 2 is estimated using the channel measured values $h_{22kl}$ and $h_{23kl}$ for the transmit antennas 2 and 3 other than the transmit antenna 1. A pair of the channel measured values ($h_{22kl}$, $h_{23kl}$) may be hereinafter referred to as the channel vector $H_{kl}$.

The memory 43c stores therein an interpolation coefficient $W_{21}$. The interpolation coefficient $W_{21}$ is a weight vector with one row and two columns. The interpolation coefficient $W_{21}$ stored in the memory 43c as an initial value for calculating the channel estimate value is, for example, (0.5, 0.5).

As for the multiplier 41a, the channel measured value $h_{22kl}$ for the transmit antenna 2 and the value at row 1 and column 1 of the interpolation coefficient $W_{21}$ are input thereto. The multiplier 41a multiplies the channel measured value $h_{22kl}$ by the value at row 1 and column 1 of the interpolation coefficient $W_{21}$ and then outputs the multiplication result to the adder 41c.

As for the multiplier 41b, the channel measured value $h_{23kl}$ for the transmit antenna 3 and the value at row 1 and column 2 of the interpolation coefficient $W_{21}$ are input thereto. The multiplier 41b multiplies the channel measured value $h_{23kl}$ by the value at row 1 and column 2 of the interpolation coefficient $W_{21}$ and then outputs the multiplication result to the adder 41c.

The adder 41c adds the values output from the multipliers 41a and 41b. That is, the multipliers 41a and 41b and the adder 41c calculate an inner product $H_{kl} \cdot W_{21}$ of the channel vector $H_{kl}$ of the transmit antennas 2 and 3 other than the transmit antenna 1 and the interpolation coefficient $W_{21}$ stored in the memory 43c. The inner product value may be hereinafter referred to as a channel estimate value for the transmit antenna 1.

The adder 42 adds the channel estimate value for the transmit antenna 1 output from the adder 41c and the negative of the channel measured value for the transmit antenna 1 output from the channel measured value 23a. That is, the adder 42 calculates an error between the channel estimate value and the channel measured value for the transmit antenna 1, which channel estimate value is estimated using the channel vector $H_{kl}$ of the transmit antennas 2 and 3 and the interpolation coefficient $W_{21}$. An error value $e_{21}$ output from the adder 42 is then output to the calculating unit 43a. In addition, the error value $e_{21}$ is also output to the determining unit 27 described in FIG. 3.

The calculating unit 43a multiplies the channel vector $H_{kl}$ of the transmit antennas 2 and 3, output from the channel measuring units 23b and 23c, by the error value $e_{21}$, which is then multiplied by the step size parameter μ. The calculating unit 43a outputs the product $\mu e_{21} H_{kl}$ to the adder 43b.

The adder 43b adds the interpolation coefficient $W_{21}$ stored in the memory 43c and the product $\mu e_{21} H_{kl}$ output from the calculating unit 43a. The result of the addition obtained by the adder 43b is stored in the memory 43c. That is, the interpolation coefficient $W_{21}$ stored in the memory 43c is updated.

The blocks of FIG. 7 repeat the above-described processing a predetermined number of times. When it is possible to interpolate the channel estimate value for the transmit antenna 1 using the channel measured values for the transmit antennas 2 and 3, the interpolation coefficient $W_{21}$ converges to an appropriate value. Then, the error value $e_{21}$ output from the adder 42 comes close to zero.

The base station 11 carries out the operation described in FIG. 7 with respect to the transmit antennas 2 and 3. That is, the base station 11 estimates a channel value for the channel between the transmit antenna 2 and the receive antenna 2 and then calculates an error value $e_{22}$ and an interpolation coefficient $W_{22}$. Similarly, the base station 11 also estimates a channel value for the channel between the transmit antenna 3 and the receive antenna 2 and then calculates an error value $e_{23}$ and an interpolation coefficient $W_{23}$.

In the case of receiving the pilot signal by the receive antenna 3 also, the base station 11 estimates channel values with respect to the transmit antennas 1 to 3 and then calculates error values $e_{31}$, $e_{32}$, and $e_{33}$ and interpolation coefficients $W_{31}$, $W_{32}$, and $W_{33}$.

FIG. 8 illustrates an operation of a determining unit. FIG. 8 provides a detail of calculation carried out by the determining unit 27, described in FIG. 3.

The determining unit 27 calculates electric powers of the error values of the channel estimate values with respect to the individual transmit antennas 1 to 3. The symbols $e_{11}$, $e_{21}$, and $e_{31}$ of FIG. 8 denote error values of the channel estimate values with respect to the transmit antenna 1 for the case where the pilot signal is received by the receive antennas 1, 2 and 3, respectively. The determining unit 27 raises each of the error values $e_{11}$, $e_{21}$, and $e_{31}$ to the second power, which are then added to each other to obtain an electric power $E_1$ of the error values of the channel estimate values for the transmit antenna 1. In a similar fashion, the determining unit 27 calculates electric powers $E_2$ and $E_3$ of the error values of the channel estimate values with respect to the transmit antennas 2 and 3, respectively.

The determining unit 27 selects the smallest error-value electric power. If the selected error-value electric power is below a predetermined threshold, the determining unit 27 determines that pilot signal transmission from an antenna corresponding to the error-value electric power is to be stopped.

Assume that the error-value electric power $E_1$ is smaller than the other error-value electric powers $E_2$ and $E_3$, and is also smaller than the predetermined threshold. In this case, the determining unit 27 determines that pilot signal transmission from the transmit antenna 1 is to be stopped.

Note that antenna information of the transmit antenna whose pilot signal transmission is determined by the determining unit 27 to be stopped is transmitted to the wireless terminal 12 by the antenna information generating unit 28 described in FIG. 3.

Based on the antenna information received from the base station 11, the wireless terminal 12 stops pilot signal transmission from the transmit antenna 1, 2, or 3 corresponding to the antenna information. With this, the communication system moves on to the second operation.

The pilot signal is not transmitted from all the transmit antennas 1 to 3 of the wireless terminal 12. The base station 11 estimates channel values for a transmit antenna whose pilot signal transmission has been stopped, based on interpolation coefficients calculated in the first operation and channel measured values for transmit antennas from which the pilot signal is being transmitted.

Assume here that the wireless terminal 12 stops pilot signal transmission frost the transmit antenna 1 while transmitting the pilot signal from the transmit antennas 2 and 3. In this case, the estimate value calculating unit 24 of the base station 11 estimates the channel value $h_{11kl}$ for the transmit antenna 1 by using the channel measured values $h_{12kl}$ and $h_{13kl}$ for the transmit antennas 2 and 3, obtained by receiving the pilot signal by the receive antenna 1, and the interpolation coefficient $W_{11}$ stored in the memory 43c. In addition, the estimate value calculating unit 24 estimates the channel value $h_{21kl}$ for the transmit antenna 1 by using the channel measured values $h_{22kl}$ and $h_{23kl}$ for the transmit antennas 2 and 3, obtained by receiving the pilot signal by the receive antenna 2, and the interpolation coefficient $W_{21}$ stored in the memory 43c. Further, the estimate value calculating unit 24 estimates the channel value $h_{31kl}$ for the transmit antenna 1 by using the channel measured values $h_{32kl}$ and $h_{33kl}$ for the transmit antennas 2 and 3, obtained by receiving the pilot signal by the receive antenna 3, and the interpolation coefficient $W_{31}$ stored in the memory 43c.

The channel measured values $h_{12kl}$, $h_{13kl}$, $h_{22kl}$, $h_{23kl}$, $h_{32kl}$, and $h_{33kl}$ output from the channel measuring units 23a to 23c and the channel estimate values $h_{1 1kl}$, $h_{2 1kl}$, and $h_{3 1kl}$ estimated by the estimate value calculating unit 24 are output to the demodulating and decoding unit 29. Using the nine channel values, the demodulating and decoding unit 29 demodulates and decodes received signals output from the DUP unit 22.

In the above-described manner, the base station 11 calculates channel estimate values for an antenna of the wireless terminal 12 by using channel measured values for the remaining antennas of the wireless terminal 12 and interpolation coefficients, and then calculates an error between each of the calculated channel estimate values and a corresponding channel measured value of the antenna. In addition, the base station 11 calculates each interpolation coefficient based on a corresponding calculated error and channel measured values for the remaining antennas of the wireless terminal 12. Subsequently, based on the calculated errors, the base station 11 determines an antenna of the wireless terminal 12, whose pilot signal transmission is to be stopped.

With this, the wireless terminal 12 does not have to transmit the pilot signal from all the antennas, which prevents increased pilot signal overhead of the wireless terminal 12 even when the number of the antennas of the base station 11 and the wireless terminal 12 increases. As a result, it is possible to reduce a decrease in data transmission efficiency.

In addition, in the second operation, the base station 11 estimates channel values for an antenna of the wireless terminal 12 by using channel measured values for the remaining antennas correlated with the antenna and interpolation coefficients. With this, the base station 11 is able to estimate channel values according to changes in the propagation channel state.

Third Embodiment

Next described is a third embodiment in detail with reference to an accompanying drawing. Assume that the base station detects an error in data received from the wireless terminal. In this case, it is likely that the current propagation channel environment has changed from the previous environment at the time when the interpolation coefficients were calculated. In view of this, the third embodiment is arranged that when detecting a retransmission request made by the base station, the wireless terminal cancels stopping of the pilot signal transmission and transmits a pilot signal from all the antennas.

Figure 9:
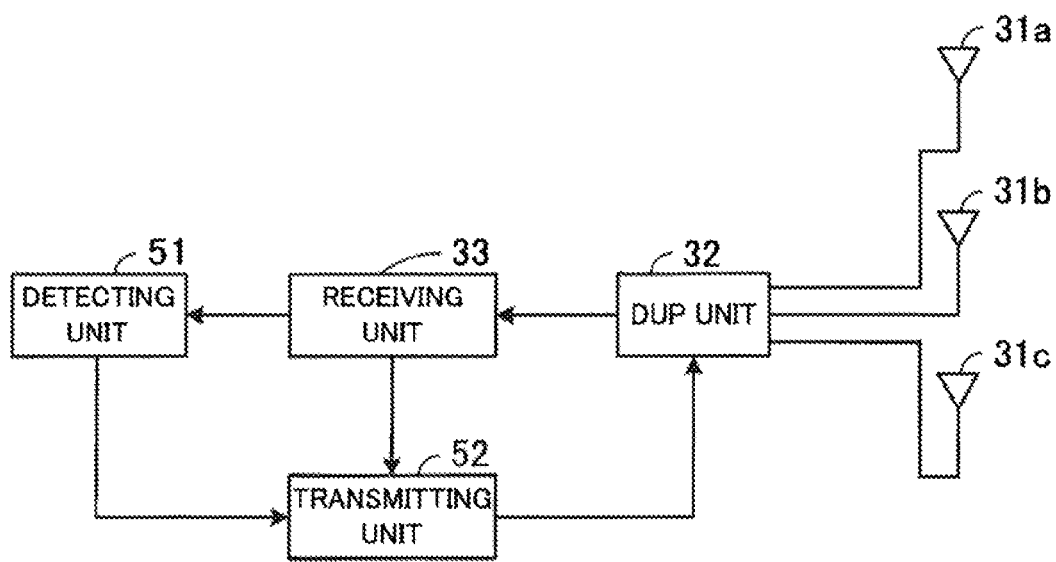
FIG. 9 is a block diagram or a wireless terminal according to a third embodiment.

FIG. 9 is a block diagram of a wireless terminal according to the third embodiment. In FIG. 9, like reference numerals are given to like components illustrated in FIG. 4 and the description thereof will be omitted.

As illustrated in FIG. 9, the wireless terminal 12 includes a detecting unit 51 and a transmitting unit 52. The detecting unit 51 detects a data retransmission request (hereinafter may be referred to as "Nack") made by the base station 11. That is, the detecting unit 51 detects whether the receiving unit 33 has received Nack from the base station 11.

The transmitting unit 52 operates in the same manner as the transmitting unit 34 of FIG. 4. Note however that, if the detecting unit 51 detects Nack, the transmitting unit 52 cancels stopping of the pilot signal transmission. That is, if the receiving unit 33 receives Nack, the transmitting unit 52 transmits the pilot signal to the base station 11 from all the antennas 31a to 31c.

As described above, the base station 11 detecting a data reception error indicates a possibility that the current propagation channel environment has changed from the previous one at the time when the interpolation coefficients were calculated. Therefore, it is preferable that the wireless communication system be configured in such a manner that when the fosse station 11 detects a reception error, the wireless terminal 12 transmits the pilot signal from all the antennas 31a to 31c and then the base station 11 recalculates the interpolation coefficients. That is, when detecting reception of Nack from the base station 11, the wireless terminal 12 transmits the pilot signal to the base station 11 from all the antennas 31a to 31c. Subsequently, the base station 11 recalculates the interpolation coefficients.

Note that, with the transmission of the pilot signal from all the antenna 31a to 31c, the wireless communication system moves on to the first operation from the second operation. That is, the base station 11 engages in the operation of calculating interpolation coefficients. The transmission of Nack allows the base station 11 to recognize the transition to the first operation, and the reception of Nack from the base station 11 allows the wireless terminal 12 to recognize the transition to the first operation.

As described above, when detecting reception of Nack from the base station 11, the wireless terminal 12 transmits the pilot signal from all the antennas 31a to 31c. With this, the base station 11 recalculates the interpolation coefficients and then estimates the channels using the appropriate interpolation coefficients.

Fourth Embodiment

Next described is a fourth embodiment in detail with reference to an accompanying drawing. According to the third embodiment, when detecting a retransmission request made by the base station, the wireless terminal cancels stopping of the pilot signal transmission and then transmits the pilot signal from all the antennas. According to the fourth embodiment, the wireless terminal periodically transmits the pilot signal from all the antennas in order to prevent a reception error at the base station.

Figure 10:
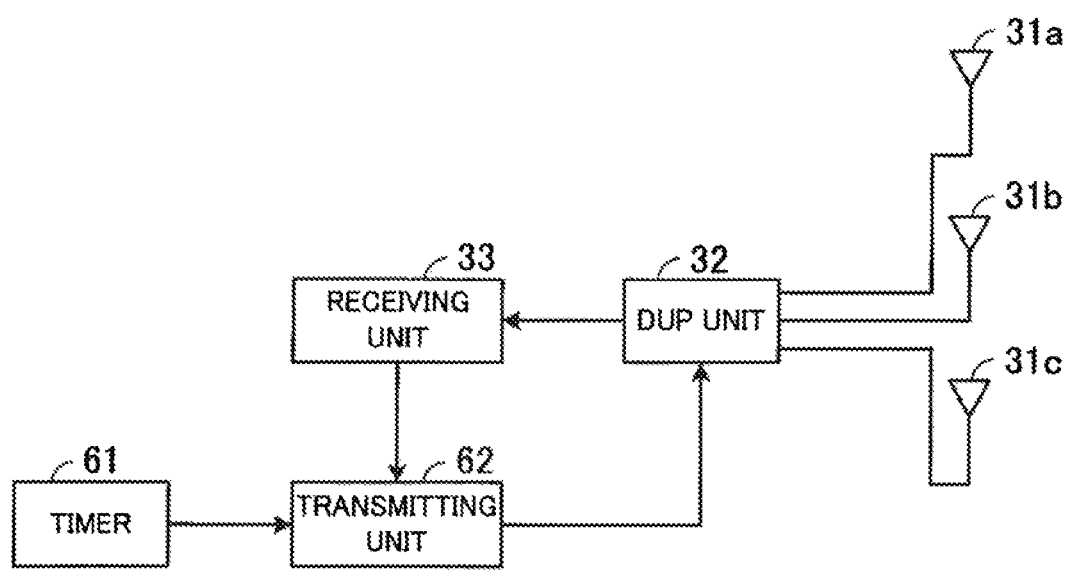
FIG. 10 is a block diagram of a wireless terminal according to a fourth embodiment.

FIG. 10 is a block diagram of a wireless terminal according to the fourth embodiment. In FIG. 10, like reference numerals are given to like components illustrated in FIG. 4 and the description thereof will be omitted.

As illustrated in FIG. 10, the wireless terminal 12 includes a timer 61 and a transmitting unit 62. The timer 61 periodically outputs a timer signal to the transmitting unit 62.

The transmitting unit 62 operates in the same manner as the transmitting unit 34 of FIG. 4. Note however that, when a timer signal is output from the timer 61, the transmitting unit 62 cancels stopping of the pilot signal transmission. That is, the transmitting unit 62 periodically transmits the pilot signal to the base station 11 from all the antennas 31a to 31c.

The wireless terminal 12 of FIG. 9 transmits the pilot signal from all the antennas 31a to 31c upon receiving Nack. On the other hand, the transmitting unit 62 of the wireless terminal 12 of FIG. 10 periodically transmits the pilot signal from all the antennas 31a to 31c regardless of receiving or not receiving Nack. Therefore, by setting the timer 61 to an appropriate interval, it is possible to recalculate the interpolation coefficients before a reception error due to changes in the interpolation coefficients occurs at the base station 11.

Note that, with the transmission of the pilot signal from all the antennas 31a to 31c, the wireless communication system moves on to the first operation from the second operation. That is, the base station 11 engages in the operation of calculating interpolation coefficients. The output of the timer signal from the timer 61 allows the wireless terminal 12 to recognize the transition to the first operation. The base station 11 recognizes the transition to the first operation by, for example, receiving a control signal serving as a notice of the transition from the wireless terminal 12.

As described above, the wireless terminal 12 periodically transmits the pilot signal to the base station 11 from ail the antennas 31a to 31c. With this, the base station 11 periodically recalculates the interpolation coefficients and then estimates channels using the appropriate interpolation coefficients. In addition, because the base station 11 periodically recalculates the interpolation coefficients, it is possible to prevent a data reception error due to changes in the interpolation coefficients.

Fifth Embodiment

Next described is a fifth embodiment in detail with reference to an accompanying drawing. According to the fifth embodiment, the wireless terminal periodically transmits the pilot signal from all the antennas, and also transmits the pilot signal from all the antennas when detecting a retransmission request made by the base station.

Figure 11:
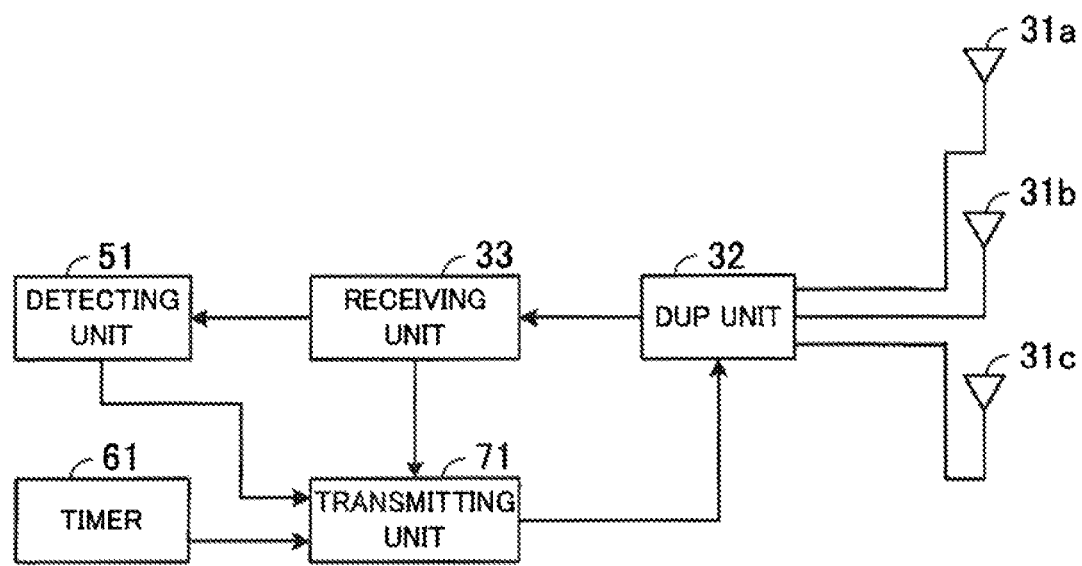
FIG. 11 is a block diagram of a wireless terminal according to a fifth embodiment.

FIG. 11 is a block diagram of a wireless terminal according to the fifth embodiment. In FIG. 11, like reference numerals are given to like components illustrated in FIGS. 9 and 10 and the description thereof will be omitted.

As illustrated in FIG. 11, the wireless terminal 12 includes a transmitting unit 71. The transmitting unit 71 operates in the same manner as the transmitting unit 34 of FIG. 4. Note however that, if the detecting unit 51 detects Nack, the transmitting unit 71 cancels stopping of the pilot signal transmission. That is, if the receiving unit 33 receives Nack, the transmitting unit 71 transmits the pilot signal to the base station 11 from all the antennas 31a to 31c.

In addition, when a timer signal is output from the timer 61, the transmitting unit 71 cancels stopping of the pilot signal transmission. That is, the transmitting unit 71 periodically transmits the pilot signal to the base station 11 from all the antennas 31a to 31c.

As described in FIG. 10, the wireless terminal 12 periodically transmitting the pilot signal to the base station 11 allows the base station 11 to recalculate the interpolation coefficients before a reception error due to changes in the interpolation coefficients occurs at the base station 11. However, a reception error due to changes in the interpolation coefficients could occur at the base station 11 before the periodic transmission of the pilot signal is made. In this case, the transmitting unit 71 transmits the pilot signal from all the antennas 31a to 31c upon detecting reception of Nack from the base station 11 so that the base station 11 responds to changes in the interpolation coefficients.

Note that, with the transmission of the pilot signal from all the antenna 31a to 31c, the wireless communication system moves on to the first operation from the second operation. That is, the base station 11 engages in the operation of calculating interpolation coefficients. The output of the timer signal from the timer 61 allows the wireless terminal 12 to recognize the transition to the first operation. The base station 11 recognizes the transition to the first operation by, for example, receiving a control signal serving as a notice of the transition from the wireless terminal 12.

In addition, the transmission of Nack allows the base station 11 to recognize the transition to the first operation, and the reception of Nack from the base station 11 allows the wireless terminal 12 to recognize the transition to the first operation.

As described above, the wireless terminal 12 periodically transmits the pilot signal to the base station 11 from all the antennas 31a to 31c, and also transmits the pilot signal from all the antennas 31a to 31c when detecting reception of Nack from the base station 11. With this, the base station 11 periodically recalculates the interpolation coefficients and then estimates channels using the appropriate interpolation coefficients. In addition, in the case where a reception error occurs, the base station 11 recalculates the interpolation coefficients and then estimates channels using the appropriate interpolation coefficients.

Sixth Embodiment

Next described is a sixth embodiment in detail with reference to an accompanying drawing. According to the sixth embodiment, the periodic interval for transmitting the pilot signal frost all the antennas as described in the fourth embodiment is changed according to the moving speed of the wireless terminal.

Figure 12:
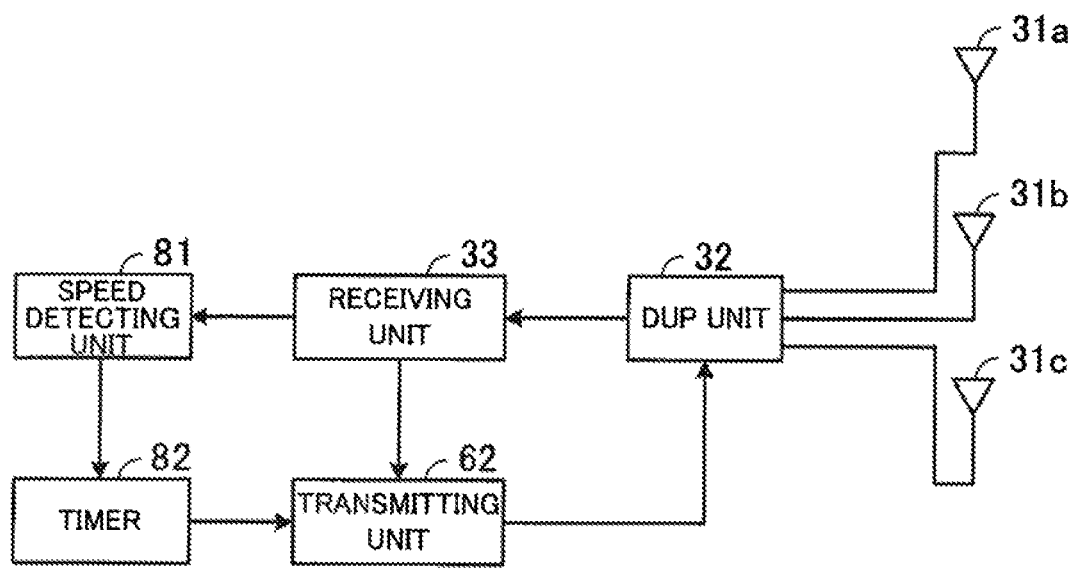
FIG. 12 is a block diagram of a wireless terminal according to a sixth embodiment.

FIG. 12 is a block diagram of a wireless terminal according to the sixth embodiment. In FIG. 12, like reference numerals are given to like components illustrated in FIG. 10 and the description thereof will be omitted.

As illustrated in FIG. 12, the wireless terminal 12 includes a speed detecting unit 81 and a timer 82. The speed detecting unit 81 detects the moving speed of the wireless terminal 12. For example, the speed detecting unit 81 detects the moving speed of the wireless terminal 12 based on the Doppler period of a control signal received by the receiving unit 33.

According to the speed of the wireless terminal 12 detected by the speed detecting unit 81, the timer 82 changes the periodic interval of the timer signal output to the transmitting unit 62. For example, if the speed of the wireless terminal 12 is greater than a predetermined threshold, the timer 82 sets the interval of the timer signal to T1. On the other hand, if the speed of the wireless terminal 12 is equal to or less than the predetermined threshold, the timer 82 sets the interval of the timer signal to T2 which is greater than T1. Note that a plurality of thresholds may be used. That is, the timer 82 may control the output interval of the timer signal in a more stepwise manner.

Changes in the propagation channels are considered to be proportional to the moving speed of the wireless terminal 12. For example, if the moving speed of the wireless terminal 12 is fast, the environment of the propagation channels also changes fast and therefore the channel values change fast. Hence, changes in the interpolation coefficients are considered to occur fast. In view of this, if the moving speed of the wireless terminal 12 is fast, the timer 82 shortens the interval of transmitting the pilot signal from all the antennas 31a to 31c. On the other hand, if the moving speed of the wireless terminal 12 is slow, the timer 82 lengthens the interval of transmitting the pilot signal from all the antennas 31a to 31c.

As described above, the wireless terminal 12 changes the periodic interval for transmitting the pilot signal from all the antennas 31a to 31c according to its moving speed. With this, the base station 11 is able to estimate the channels using appropriate interpolation coefficients.

Note that the moving speed of the wireless terminal 12 is detected based on the Doppler period of the control signal in the above description, however, the moving speed may be detected by a global positioning system (GPS) instead.

Seventh Embodiment

Next described is a seventh embodiment in detail with reference to an accompanying drawing. According to the seventh embodiment, functional components of the base station are grouped into blocks according to the frequencies of the pilot signal and then the pilot signal is assigned to the individual blocks for processing.

Figure 13:
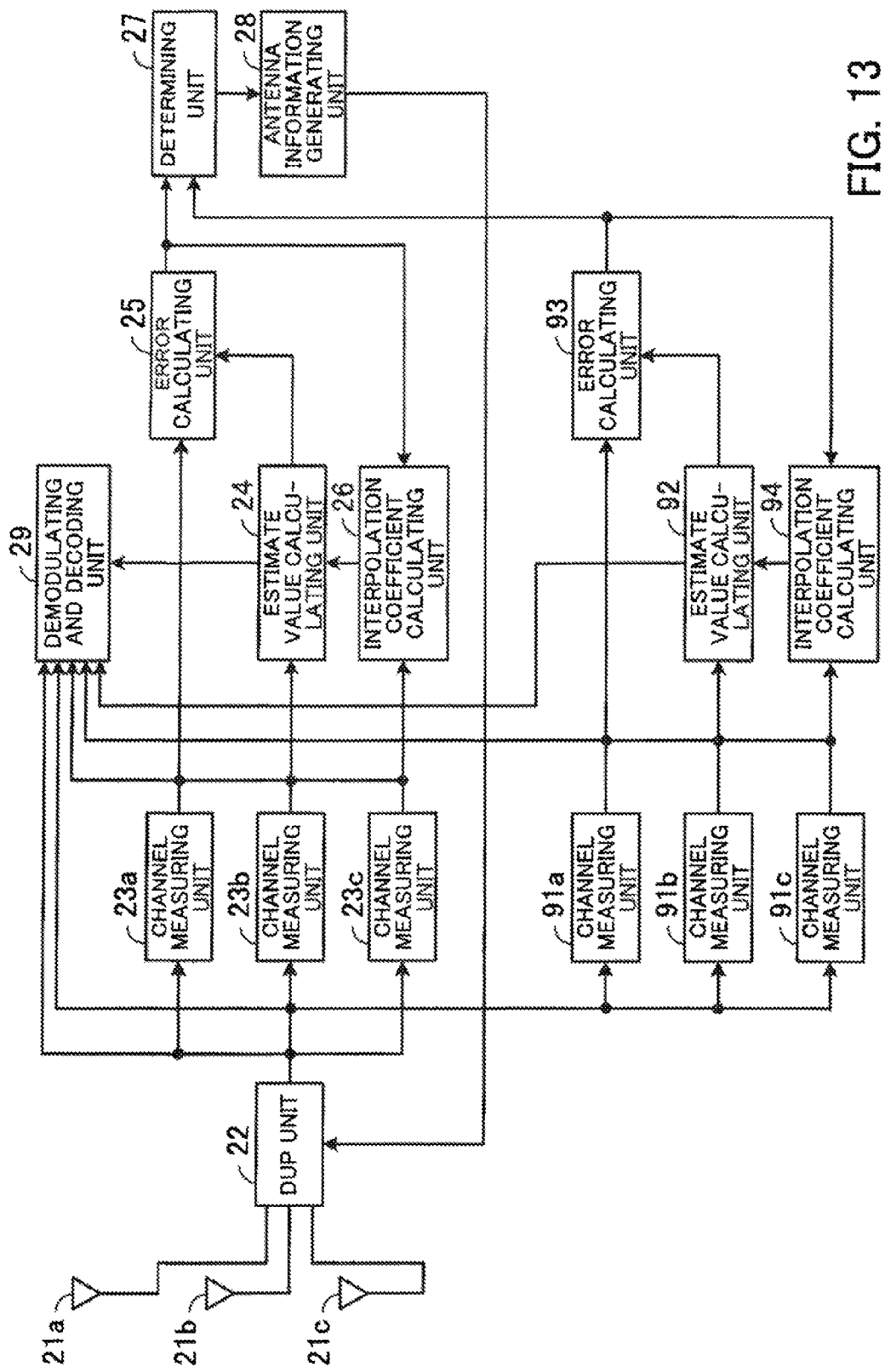
FIG. 13 is a block diagram of a base station according to a seventh embodiment.

FIG. 13 is a block diagram of a base station according to the seventh embodiment. In FIG. 13, like reference numerals are given to like components illustrated in FIG. 3 and the description thereof will be omitted.

As illustrated in FIG. 13, the base station 11 includes channel measuring units 91a to 91c, an estimate value calculating unit 92, an error calculating unit 93, and an interpolation coefficient calculating unit 94. The channel measuring units 91a to 91c, the estimate value calculating unit 92, the error calculating unit 93, and the interpolation coefficient calculating unit 94 operate in the same manner as the channel measuring units 23a to 23c, the estimate value calculating unit 24, the error calculating unit 25, and the interpolation coefficient calculating unit 26, respectively. Note however that the two blocks deal with processing of different frequencies of the pilot signal, that is, the channel measuring units 91a to 91c, the estimate value calculating unit 92, the error calculating unit 93, and the interpolation coefficient calculating unit 94 deal with frequencies of the pilot signal different from those dealt by the channel measuring units 23a to 23c, the estimate value calculating unit 24, the error calculating unit 25, and the interpolation coefficient calculating unit 26.

For example, the channel measuring units 23a to 23c, the estimate value calculating unit 24, the error calculating unit 25, and the interpolation coefficient calculating unit 26 are in charge of channel value measurement and estimation, error value calculation, and interpolation coefficient calculation with respect to subcarriers with numbers k=0 to 1023 of the pilot signal. That is, the channel measuring units 23a to 23c, the estimate value calculating unit 24, the error calculating unit 25, and the interpolation coefficient calculating unit 26 measure and estimate channel values $h_{ijkl}$ with k=0 to 1023, and then calculate error values and interpolation coefficients.

On the other hand, the channel measuring units 91a to 91c, the estimate value calculating unit 92, the error calculating unit 93, and the interpolation coefficient calculating unit 94 are in charge of channel value measurement and estimation, error value calculation, and interpolation coefficient calculation with respect to subcarriers with numbers k=1024 to 2047 of the pilot signal. That is, the channel measuring units 91a to 91c, the estimate value calculating unit 92, the error calculating unit 93, and the interpolation coefficient calculating unit 94 measure and estimate channel values $h_{ijkl}$ with k=1024 to 2047, and then calculate error values and interpolation coefficients.

In the case where the pilot signal has a higher bandwidth, variation may be observed in each interpolation coefficient for a higher frequency part and a lower frequency part of the bandwidth. However, the base station 11 of FIG. 13 performs channel value measurement and estimation, error calculation, and interpolation coefficient calculation with respect to each of the plurally divided frequency blocks of the pilot signal. With this, even when the pilot signal has a higher bandwidth, it is possible to calculate appropriate interpolation coefficients.

Note that the determining unit 27 calculates electric powers of errors for the individual antennas A to C of the wireless terminal 12, which errors are calculated by the error calculating units 25 and 93. The determining unit 27 selects the smallest one from among the calculated error powers and then determines whether the selected error power is below a predetermined threshold. When determining that the error power is below the predetermined threshold, the determining unit 27 determines that pilot signal transmission from an antenna corresponding to the error power is to be stopped.

Alternatively, the determining unit 27 calculates electric powers of errors for the individual antennas A to C of the wireless terminal 12 with respect to each of the frequency blocks of the pilot signal, to thereby determine an antenna whose pilot signal transmission is to be stopped.

As described above, the channel measuring units 23a to 23c and 91a to 91c, the estimate value calculating units 24 and 92, the error calculating units 25 and 93, and the interpolation coefficient calculating units 26 and 94 of the base station 11 perform channel value measurement and estimation, error value calculation, and interpolation coefficient calculation with respect to each frequency block of the pilot signal. With this, the base station is able to estimate channels using appropriate interpolation coefficients.

Eighth Embodiment

Next described is an eighth embodiment in detail with reference to an accompanying drawing. According to the second embodiment, the base station calculates an error power for each transmit antenna by repeating processing of the interpolation coefficient calculation a predetermined number of times. Then, the base station selects a transmit antenna with the smallest error power, and determines that pilot signal transmission from the selected transmit antenna is to be stopped if the error power of the transmit antenna is below a predetermined threshold. According to the eighth embodiment, the aforementioned processing is repeated. That is, in the eighth embodiment, yet another antenna whose pilot signal transmission is to be stopped is selected from among antennas other than the antenna whose pilot signal transmission has already been stopped. The base station and the wireless terminal of the eighth embodiment have the same functional components as illustrated in FIGS. 3 and 4, respectively, and the functional components repeat the same processing as that described in the second embodiment.

Assume that, in the first operation, the determining unit 27 determines that pilot signal transmission from a transmit antenna of the wireless terminal 12 is to be stopped. The antenna information generating unit 28 generates antenna information indicating the transmit antenna determined by the determining unit 27 and transmits the generated antenna information to the wireless terminal 12. The wireless terminal 12 stops pilot signal transmission from the transmit antenna indicated by the antenna information received from the base station 11.

The estimate value calculating unit 24 of the base station 11 calculates (estimates) channel values for the transmit antenna, whose pilot signal transmission has been stopped, by using interpolation coefficients stored in the memory 43c and channel measured values for the remaining transmit antennas of the wireless terminal 12. Subsequently, the estimate value calculating unit 24 calculates channel values for a transmit antenna selected from among the remaining transmit antennas by using channel measured values for the remaining transmit antennas other than the newly selected transmit antenna, the channel values calculated (estimated) earlier, and the interpolation coefficients.

Assume that the wireless terminal 12 has stopped pilot signal transmission from the transmit antenna 1. In this case, the estimate value calculating unit 24 calculates (estimates) channel values for the transmit antenna 1, whose pilot signal transmission has been stopped, by using the interpolation coefficients stored in the memory 43c and the channel measured values for the remaining transmit antennas 2 and 3. Subsequently, the estimate value calculating unit 24 calculates (estimates) channel values for the transmit antenna 2 selected from between the remaining transmit antennas 2 and 3 by using the channel measured values for the yet remaining transmit antenna 3, the channel values calculated (estimated) earlier for the transmit antenna 1, and the interpolation coefficients.

The error calculating unit 25 calculates errors between the channel measured values and the corresponding channel estimate values for a transmit antenna of the wireless terminal 12, which channel estimate values have been estimated by the estimate value calculating unit 24.

For example, according to the example stated above, the error calculating unit 25 calculates errors between the channel estimate values and the corresponding channel measured values for the transmit antenna 2 of the wireless terminal 12. Note that the pilot signal is being transmitted from the transmit antennas 2 and 3 of the wireless terminal 12.

The interpolation coefficient calculating unit 26 calculates interpolation coefficients based on the errors for the transmit antenna calculated by the error calculating unit 25 and the channel estimate values and the channel measured values for the remaining transmit antennas of the wireless terminal 12.

For example, according to the example above, the interpolation coefficient calculating unit 26 calculates interpolation coefficients based on the errors for the transmit antenna 2 calculated by the error calculating unit 25 and the channel estimate values and the channel measured values for the remaining transmit antenna 3 of the wireless terminal 12.

Based on the errors calculated by the error calculating unit 25, the determining unit 27 determines that pilot signal transmission from the transmit antenna of the wireless terminal 12 is to be stopped. The antenna information generating unit 28 generates antenna information indicating the antenna whose pilot signal transmission is determined to be stopped by the determining unit 27.

According to the example above, based on the errors calculated by the error calculating unit 25, the determining unit 27 determines that pilot signal transmission from the transmit antenna 2 of the wireless terminal 12 is to be stopped. The antenna information generating unit 28 generates antenna information indicating the transmit antenna 2 whose pilot signal transmission is determined to be stopped by the determining unit 27.

The generated antenna information is output to the DUP unit 22, and then transmitted to the wireless terminal 12. Based on the antenna information sent from the base station 11, the wireless terminal 12 stops pilot signal transmission from yet another transmit antenna. According to the example above, the wireless terminal 12 stops pilot signal transmission from the transmit antenna 2 in addition to the transmit antenna 1.

The above-described processing is repeated as long as there is a transmit antenna whose error power is less than a predetermined threshold. That is, even after the determining unit 27 determines that pilot signal transmission from a transmit antenna of the wireless terminal 12 is to be stopped, the estimate value calculating unit 24, the error calculating unit 25, the interpolation coefficient calculating unit 26, and the determining unit 27 repeat the same processing for the remaining transmit antennas of the wireless terminal 12. The estimate value calculating unit 24, the error calculating unit 25, the interpolation coefficient calculating unit 26, and the determining unit 27 repeat the processing as long as there is a transmit antenna whose error power is less than a predetermined threshold.

Figure 14:
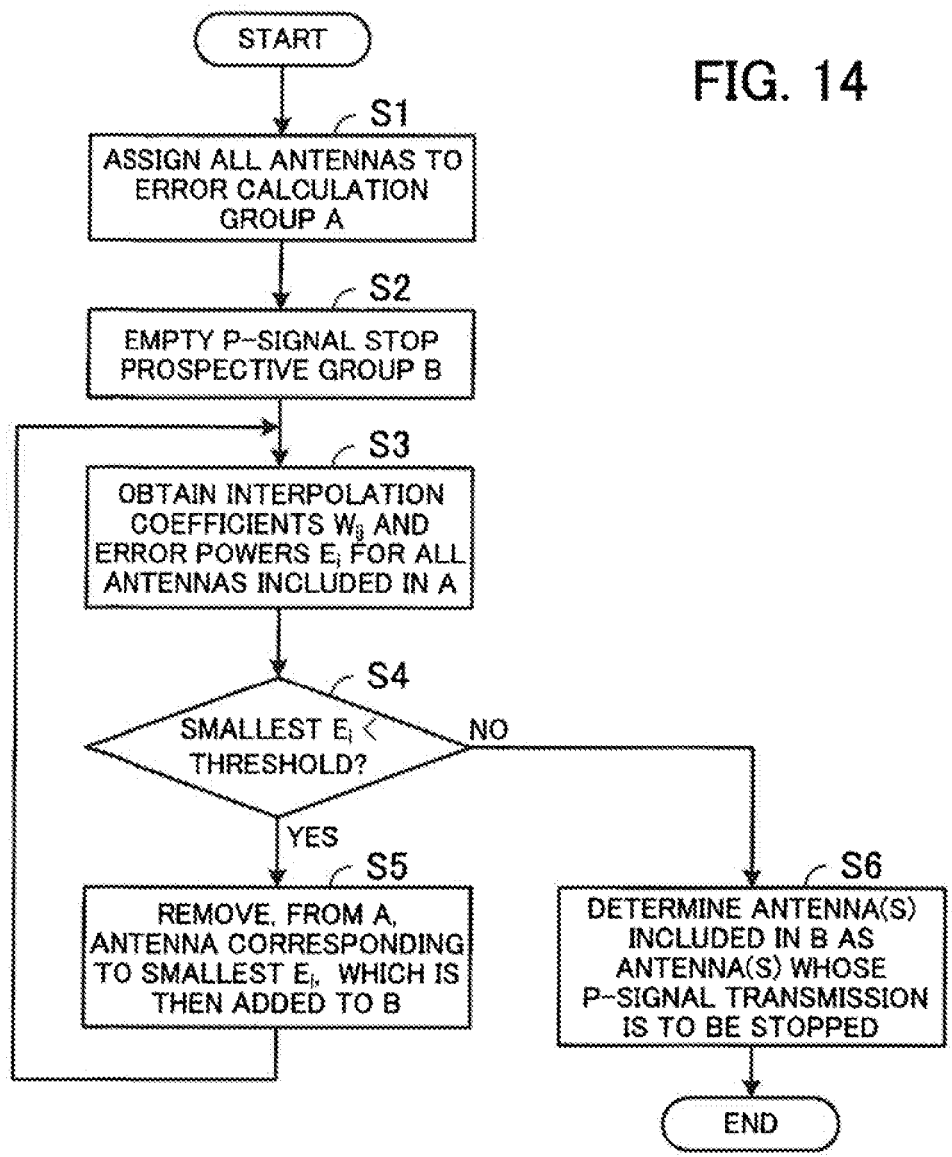
FIG. 14 is a flowchart illustrating processing of a base station according to an eighth embodiment and
FIG. 15 is a hardware configuration example of the base station.

FIG. 14 is a flowchart illustrating processing of the base station according to the eighth embodiment. The processing of the flowchart may be executed, for example, by a processor to be described later.

[Step S1] The determining unit 27 assigns all the antennas of the wireless terminal 12 (for example, identifiers of the antennas 31a to 31c of the wireless terminal 12) to an error calculation group A (variable).

[Step S2] The determining unit 27 empties a pilot signal (P-signal) stop prospective group B (variable).

[Step S3] The estimate value calculating unit 24, the error calculating unit 25, and the interpolation coefficient calculating unit 26 obtain the interpolation coefficients $W_{ij}$ and the error powers $E_i$ for all the antennas included in Variable A.

[Step S4] The determining unit 27 determines whether the smallest error power $E_i$ is less than a predetermined threshold. If the smallest error power $E_i$ is less than the predetermined threshold, the determining unit 27 proceeds to step S5. On the other hand, if the smallest error power $E_i$ is equal to or more than the predetermined threshold, the determining unit 27 proceeds to step S6.

[Step S5] The determining unit 27 removes an antenna corresponding to the smallest error power $E_i$ from Variable A and then adds the removed antenna to Variable B. The determining unit 27 proceeds to step S3.

[Step S6] The determining unit 27 determines that one or more antennas included in Variable B as antennas whose pilot signal transmission is to be stopped.

Thus, in the case where the determining unit 27 has determined that pilot signal transmission from a transmit antenna of the wireless terminal 12 is to be stopped, the estimate value calculating unit 24, the error calculating unit 25, the interpolation coefficient calculating unit 26, and the determining unit 27 of the base station 11 repeat the same processing on the remaining transmit antennas of the wireless terminal 12. With this, it is possible to increase the number of transmit antennas of the wireless terminal 12 whose pilot signal transmission is stopped, further reducing a decrease in data transmission efficiency.

Note that the individual base station and wireless terminal described in the first and eighth embodiments above may implement the functions using, for example, field programmable gate arrays (FPGA). Alternatively, the functions may be implemented by a central processing unit (CPU) and a digital signal processor (DSP).

Figure 15:
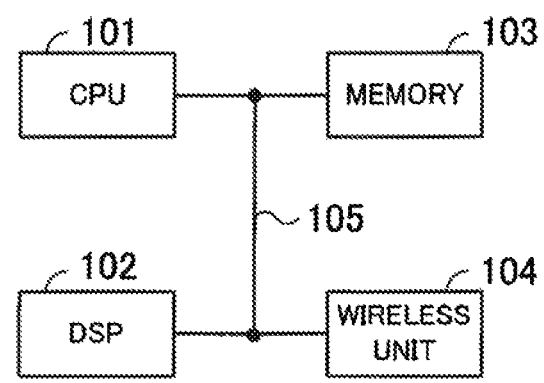

FIG. 15 is a hardware configuration example of the base station. As illustrated in FIG. 15, the base station includes a CPU 101, a DSP 102, a memory 103, a wireless unit 104, and a bus 105. To the CPU 101, the DSP 102, the memory 103, and the wireless unit 104 are connected via the bus 105, and the CPU 101 has overall control of the base station.

The memory 103 stores therein an operating system (OS) program and application programs to be executed by the CPU 101 and the DSP 102. The memory 103 also stores various types of data needed for processing of the CPU 101 and the DSP 102.

The wireless unit 104 wirelessly communicates with the wireless terminal. For example, the wireless unit 104 converts digital signals processed by the CPU 101 and the DSP 102 from digital to analog (D/A), and up-converts the frequency of the D/A converted signals, which are then transmitted to the wireless terminal. In addition, the wireless unit 104 down-converts the frequency of signals received from the wireless terminal and then converts the signals from analog to digital (A/D). The A/D converted signals undergo predetermined processing carried out by the CPU 101 and the DSP 102.

The individual functions of the base station described in the first to eighth embodiments may be implemented, for example, by the CPU 101 and the DSP 102. In addition, the wireless terminal may also have the same hardware configuration as illustrated in FIG. 15, and the individual functions of the wireless terminal described in the first to eighth embodiments may be implemented, for example, by the CPU 101 and the DSP 102. Note that only one each of the CPU 101 and the DSP 102 is illustrated, however, a plurality of CPUs 101 and DSPs 102 may be provided instead.

According to the apparatuses, methods and system disclosed herein, it is possible to reduce a decrease in data transmission efficiency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A base station for wirelessly communicating with a wireless terminal having a plurality of transmit antennas using multiple-input and multiple-output, comprising:
   a measuring unit configured to measure channel values of propagation channels based on a pilot signal transmitted from the wireless terminal;
   an interpolation coefficient calculating unit configured to calculate interpolation coefficients used to estimate channel values for one of the transmit antennas of the wireless terminal by using channel values for rest of the transmit antennas, which channel values are measured by the measuring unit;
   an estimate value calculating unit configured to estimate the channel values for the one of the transmit antennas based on the interpolation coefficients calculated by the interpolation coefficient calculating unit and the channel values for the rest of the transmit antennas measured by the measuring unit; and
   an error calculating unit configured to calculate errors between the individual channel values for the one of the transmit antennas estimated by the estimate value calculating unit and corresponding channel values for the one of the transmit antennas measured by the measuring unit,
   wherein the interpolation coefficient calculating unit calculates the interpolation coefficients based on the errors calculated by the error calculating unit and the channel values for the rest of the transmit antennas measured by the measuring unit.

2. The base station according to claim 1, further comprising a determining unit configured to determine whether transmission of the pilot signal from the one of the transmit antennas is to be stopped, based on the errors calculated by the error calculating unit.

3. The base station according to claim 2, wherein the measuring unit, the interpolation coefficient calculating unit, the estimate value calculating unit, and the error calculating unit perform the measurement of the channel values, the calculation of the interpolation coefficients, the estimation of the channel values, and the calculation of the errors with respect to each frequency block of the pilot signal.

4. The base station according to claim 2, wherein when the determining unit has determined that transmission of the pilot signal from the one of the transmit antennas is to be stopped, the interpolation coefficient calculating unit, the estimate value calculating unit, and the error calculating unit repeat same processing on the rest of the transmit antennas.

5. A wireless terminal having a plurality of antennas and wirelessly communicating with a base station using multiple-input and multiple-output, the wireless terminal comprising:
   a transmitting unit configured to transmit a pilot signal from each antenna and stop transmission of the pilot signal from the one of the antennas, indicated by an antenna information transmitted from the base station; and
   a receiving unit configured to receive the antenna information indicating one of the antennas, whose transmission of the pilot signal is to be stopped;
   wherein, when a data retransmission request is made by the base station, the transmitting unit transmits the pilot signal from all of the antennas.

6. The wireless terminal according to claim 5, wherein the transmitting unit periodically transmits the pilot signal from all of the antennas.

7. The wireless terminal according to claim 6, wherein the transmitting unit changes a periodic interval for transmitting the pilot signal from all of the antennas according to frequency of the data retransmission request made by the base station.

8. The wireless terminal according to claim 6, wherein the transmitting unit changes a periodic interval for transmitting the pilot signal from all of the antennas according to moving speed of the wireless terminal.

9. A wireless communication system comprising a base station and a wireless terminal for wirelessly communicating with each other using multiple-input and multiple-output, the wireless terminal having a plurality of transmit antennas,
   wherein the base station includes
      a measuring unit which measures channel values of propagation channels based on a pilot signal transmitted from the wireless terminal; an interpolation coefficient calculating unit which calculates interpolation coefficients used to estimate channel values for one of a plurality of transmit antennas of the wireless terminal by using channel values for rest of the transmit antennas, which channel values are measured by the measuring unit;
      an estimate value calculating unit which estimates the channel values for the one of the transmit antennas based on the interpolation coefficients calculated by the interpolation coefficient calculating unit and the channel values for the rest of the transmit antennas measured by the measuring unit, and
      an error calculating unit configured to calculate errors between the individual channel values for the one of the transmit antennas estimated by the estimate value calculating unit and corresponding channel values for the one of the transmit antennas measured by the measuring unit, wherein the interpolation coefficient calculating unit calculates the interpolation coefficients based on the errors calculated by the error calculating unit and the channel values for the rest of the transmit antennas measured by the measuring unit, and
   the wireless terminal includes
      a receiving unit which receives, from the base station, antenna information indicating one of the transmit antennas, whose transmission of the pilot signal is to be stopped; and a transmitting unit which stops transmission of the pilot signal from the one of the transmit antennas, indicated by the antenna information received by the receiving unit.

* * * * *